(12) United States Patent
Enomoto et al.

(10) Patent No.: US 8,466,872 B2
(45) Date of Patent: Jun. 18, 2013

(54) INPUT APPARATUS

(75) Inventors: Masatoshi Enomoto, Okayama (JP); Tamotsu Yamamoto, Hyogo (JP); Kenji Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 12/969,713

(22) Filed: Dec. 16, 2010

(65) Prior Publication Data

US 2011/0163960 A1    Jul. 7, 2011

(30) Foreign Application Priority Data

Jan. 7, 2010   (JP) .................................. 2010-001677

(51) Int. Cl.
*G09G 5/00*     (2006.01)

(52) U.S. Cl.
USPC ........... 345/156; 345/157; 345/163; 345/167; 200/277; 200/283

(58) Field of Classification Search
USPC .. 345/156, 167, 184, 157, 163, 169; 200/277, 200/283
See application file for complete search history.

(56) References Cited

U.S. PATENT DOCUMENTS

| 2007/0080946 A1* | 4/2007 | Fyke et al. ..................... 345/167 |
| 2008/0030473 A1* | 2/2008 | Kaizaki et al. ................ 345/167 |
| 2011/0134041 A1* | 6/2011 | Yamamoto et al. ........... 345/167 |

FOREIGN PATENT DOCUMENTS

| JP | 2001-296966 A | 10/2001 |
| JP | 2001-330470 A | 11/2001 |
| JP | 2007-219674 A | 8/2007 |
| JP | 2009-259024 A | 11/2009 |

OTHER PUBLICATIONS

T. Takahashi et al., "Development of Combinatorial Science," 2007, CMC Publishing Co., Ltd. (with partial English translation).
Chinese Office Action for Application No. 201110005763.1 dated Jan. 29, 2013, with partial English translation.

* cited by examiner

*Primary Examiner* — Quan-Zhen Wang
*Assistant Examiner* — Jennifer Nguyen
(74) *Attorney, Agent, or Firm* — RatnerPrestia (57) ABSTRACT

An input apparatus includes a case, an operation body stored rotatably in the case, a magnetic body fixed to the operation body, a magnet provided around the operation body, a magnetic detection element for detecting a magnetic flux from the magnetic body, and a frame for retaining the case. The magnetic detection element faces the operation body with a predetermined space therebetween. The frame includes depression sections for causing the magnetic detection element to elastically contact the lower surface of the case. This input apparatus can accurately detect a rotation angle.

3 Claims, 7 Drawing Sheets

INPUT APPARATUS

TECHNICAL FIELD

The present invention relates to an input apparatus mainly used to operate various electronic devices.

BACKGROUND ART

In recent years, with the advent of electronic devices such as mobile phones and personal computers having a more sophisticated function or a smaller size, input apparatuses used to operate such devices also have been required to provide a secure operation with a favorable operation feeling.

Figure 6:
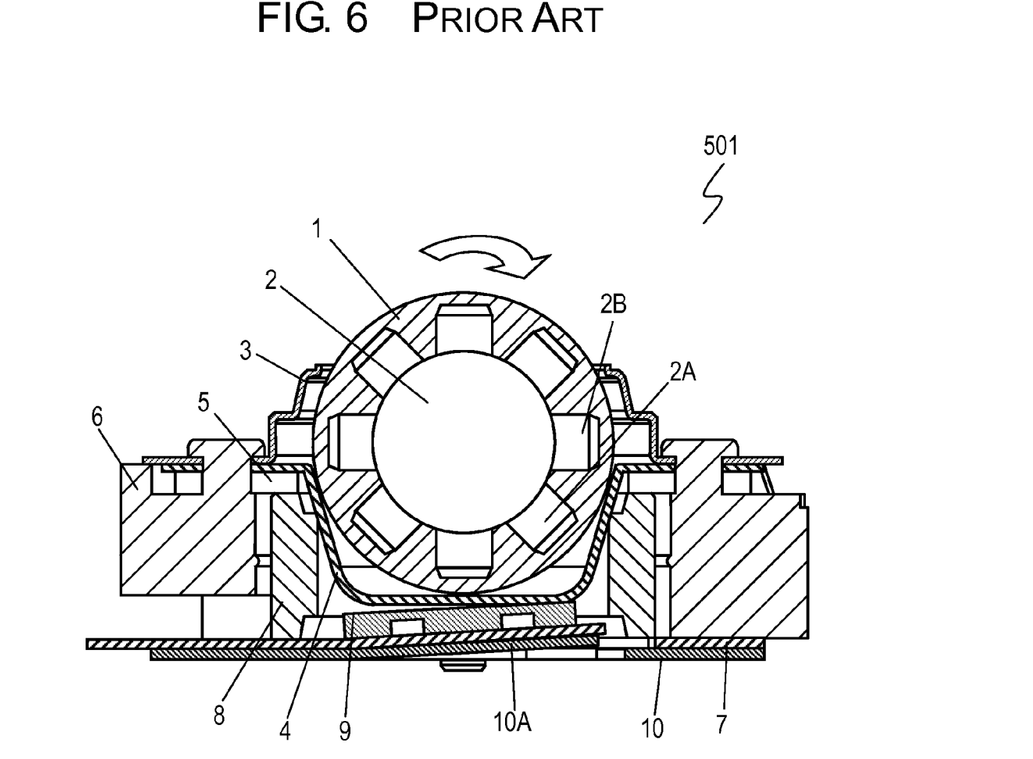
FIG. 6 is a cross-sectional view of a conventional input apparatus.
Figure 7:
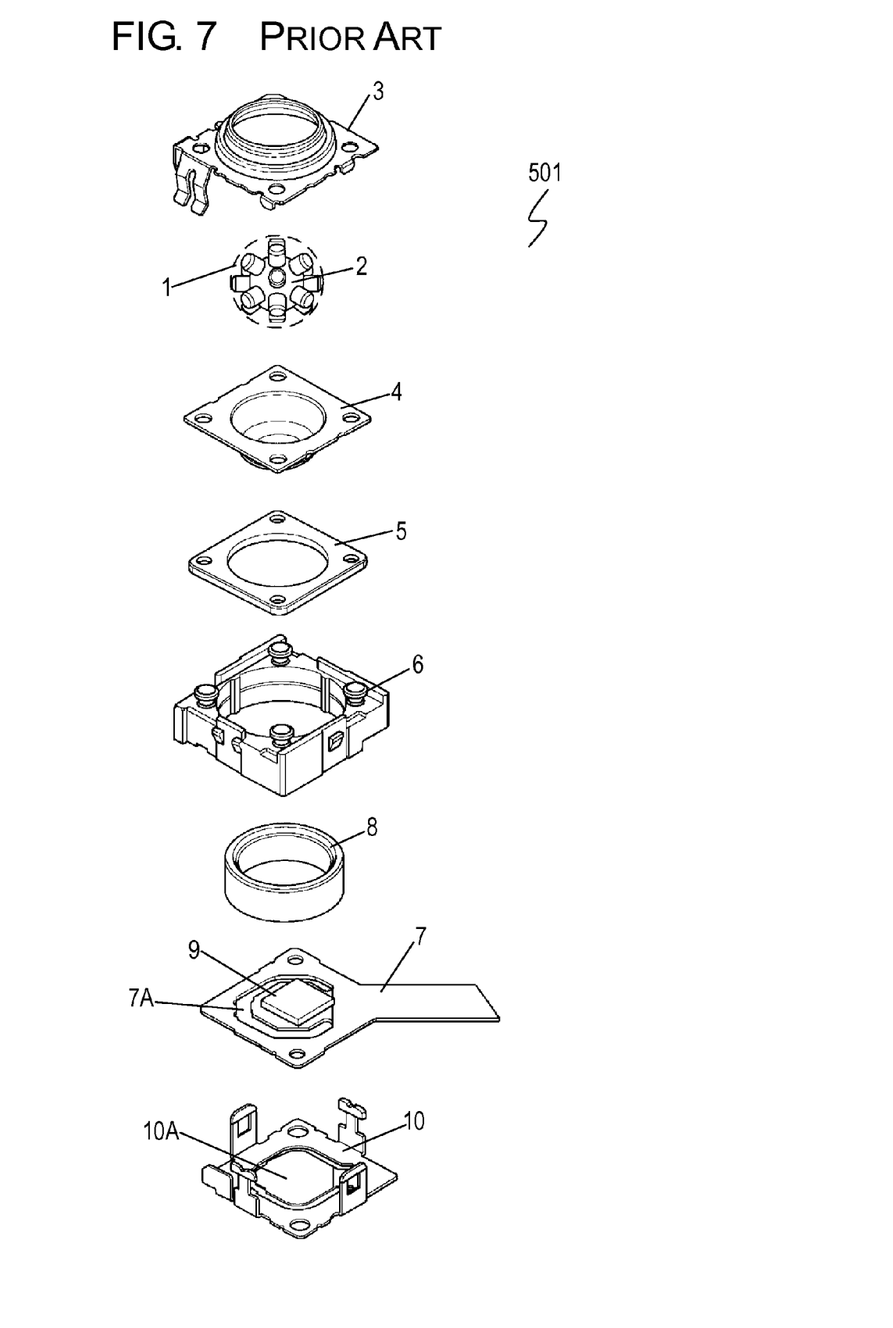
FIG. 7 is an exploded perspective view of the conventional input apparatus.

FIG. 6 and FIG. 7 are a cross-sectional view and an exploded perspective view of conventional input apparatus 501, respectively. Input apparatus 501 includes: operation body 1 that has a spherical shape and that is made of insulating resin; and magnetic body 2 made of iron or permalloy for example. Magnetic body 2 has a substantially-spherical core and substantially-circular columnar protrusions 2A and 2B protruding from the core. Protrusions 2A and 2B radially protrude from the core to the exterior. Magnetic body 2 is buried in operation body 1.

Upper case 3 and lower case 4 both made of a thin metal plate have operation body 1 stored rotatably between the upper and lower cases. An upper part of operation body 1 protrudes through an opening hole in an upper surface of upper case 3.

Upper case 3 and lower case 4 storing operation body 1 are placed on an upper surface of retention body 6 via cover 5. Cover 5 has a substantially plate-like shape and is made of elastic material, such as rubber. Retention body 6 is made of insulating resin.

At upper and lower surfaces of film-like wiring board 7, a plurality of wiring patterns are formed. At a lower side of operation body 1, the upper surface of wiring board 7 has thereon substantially cylindrical magnet 8, such as a ferrite magnet, so that the north pole faces upward and the south pole faces downward, for example.

Magnetic detection element 9 has magnetic sensors, such as a plurality of Hall elements, arranged. Magnetic detection element 9 is mounted on the upper surface of wiring board 7 and faces operation body 1 with a predetermined space therebetween. Magnetic detection element 9 is surrounded by wiring board 7 that includes therein substantially U-shaped notch 7A.

Frame 10 made of a thin metal plate has an upper part fixed to retention body 6 and retains upper case 3 and lower case 4, and operation body 1 stored in this, magnet 8, and magnetic detection element 9 at predetermined positions.

Figure 8:
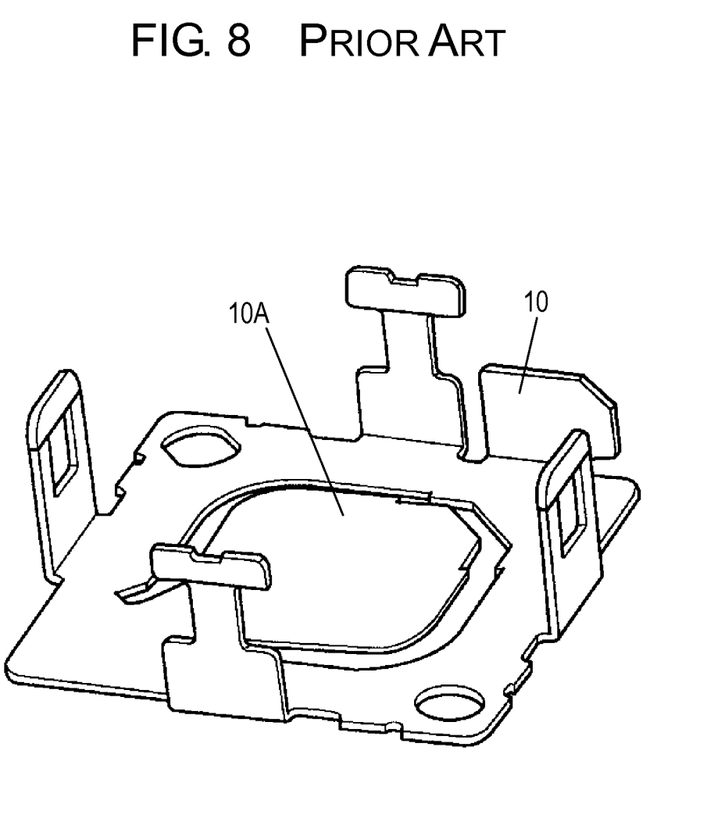
FIG. 8 is a perspective view of a frame of the conventional input apparatus.

FIG. 8 is a perspective view of frame 10. A bottom surface of frame 10 has substantially-rectangular plate spring 10A. One end of plate spring 10A is bent and the other end protrudes in an upward direction. While plate spring 10A is slightly deflected, an end of plate spring 10A depresses a lower surface of magnetic detection element 9 via wiring board 7 to allow an upper surface of magnetic detection element 9 to elastically contact a lower surface of lower case 4 to constitute input apparatus 501 (see FIG. 7).

Input apparatus 501 is attached to an operation section of an electronic device, such as a mobile phone or a personal computer, such that the upper part of operation body 1 is protruded. Magnetic detection element 9 is electrically connected to an electronic circuit of the device via a wiring pattern for example.

When the upper part of operation body 1 is operated with a finger by rotating the upper part from front to back and from side to side or in an oblique direction while a plurality of menus, such as names or song titles, or a cursor are displayed on a display unit, such as a liquid crystal display element, of the electronic device, magnetic body 2 buried in operation body 1 is rotated accordingly. When operation body 1 is rotated in the right direction for example, protrusion 2A of magnetic body 2 is firstly moved toward magnetic detection element 9.

Magnetic detection element 9 detects, via protrusion 2A, the magnetic flux of substantially-cylindrical magnet 8 provided at a lower side of operation body 1. When operation body 1 is continuously operated by being rotated in the right direction, protrusion 2A is moved away from magnetic detection element 9, and then, protrusion 2B is moved toward magnetic detection element 9. As a result, the magnetic flux of magnet 8 is detected by magnetic detection element 9 via protrusion 2B.

Then, the magnetic flux detected through protrusions 2A and 2B of magnetic body 2 having moved away from and toward magnetic detection element 9 is output by magnetic detection element 9 as voltage signals having a phase difference to the electronic circuit of the device. The electronic circuit uses this signal to detect the rotation direction and the rotation angle of operation body 1, and moves the cursor for example on the menu displayed on the display unit of the device by a distance corresponding to the rotation angle in the right direction for example.

A voltage signal is similarly output from magnetic detection element 9 when operation body 1 is operated by being rotated in the left direction, the front-and-rear direction, or an oblique direction between these directions. Then, the electronic circuit detects the rotation direction and the rotation angle of operation body 1 and the cursor for example is moved in the left direction, the up-and-down direction, or the oblique direction.

Specifically, a user can operate, while looking at the display unit of the device, operation body 1 by rotating operation body 1 in a predetermined direction to move the cursor for example displayed on a display means in a predetermined direction to thereby easily select the menu for example.

An input apparatus similar to conventional input apparatus 501 is disclosed in Japanese Patent Unexamined Publication No. 2009-259024.

In conventional input apparatus 501 shown in FIG. 6 to FIG. 8, an end of substantially-rectangular plate spring 10A of a bottom surface of frame 10 depresses the lower surface of magnetic detection element 9 to cause the upper surface of magnetic detection element 9 to elastically contact the lower surface of lower case 4. Thus, magnetic detection element 9 elastically contacts the lower surface of lower case 4 while being slightly inclined thereto. This consequently causes a slight error in the detected magnetic flux, which may make it difficult to accurately detect the rotation angle of operation body 1.

SUMMARY OF THE INVENTION

An input apparatus includes a case, an operation body stored rotatably in the case, a magnetic body fixed to the operation body, a magnet provided around the operation body, a magnetic detection element for detecting a magnetic flux from the magnetic body, and a frame for retaining the case. The magnetic detection element faces the operation body with a predetermined space therebetween. The frame includes depression sections for causing the magnetic detection element to elastically contact the lower surface of the case.

This input apparatus can accurately detect a rotation angle.

DETAILED DESCRIPTION OF PREFERRED EMBODIMENTS

Figure 1:
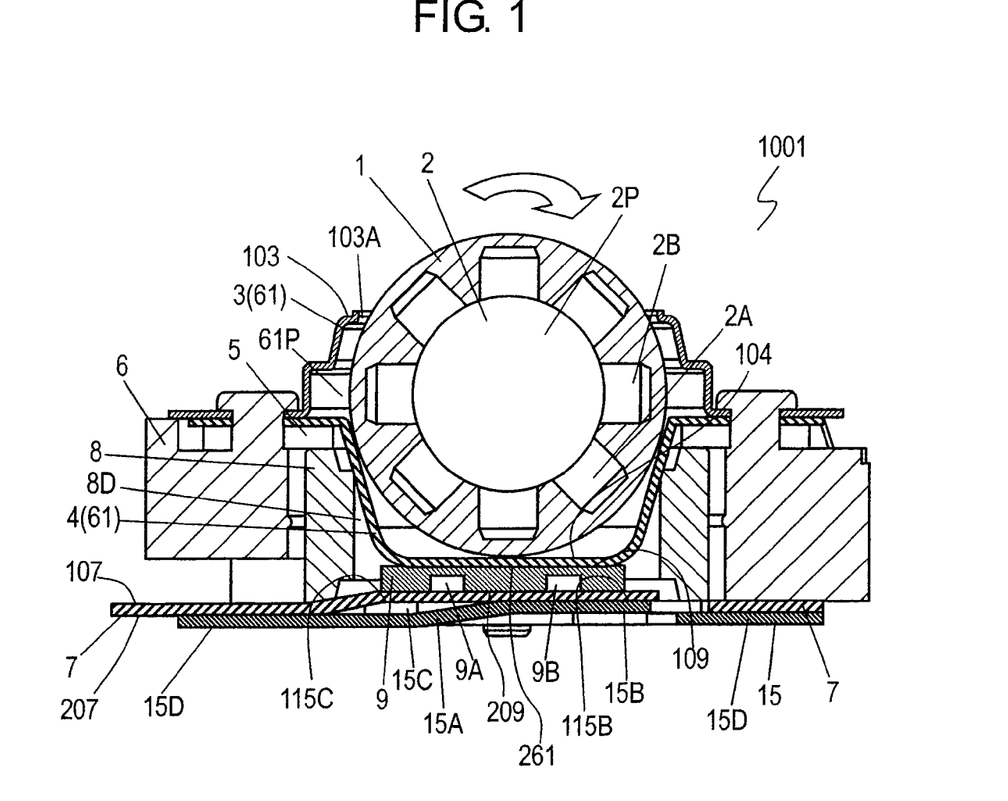
FIG. 1 is a cross-sectional view of an input apparatus according to an exemplary embodiment of the present invention.
Figure 2:
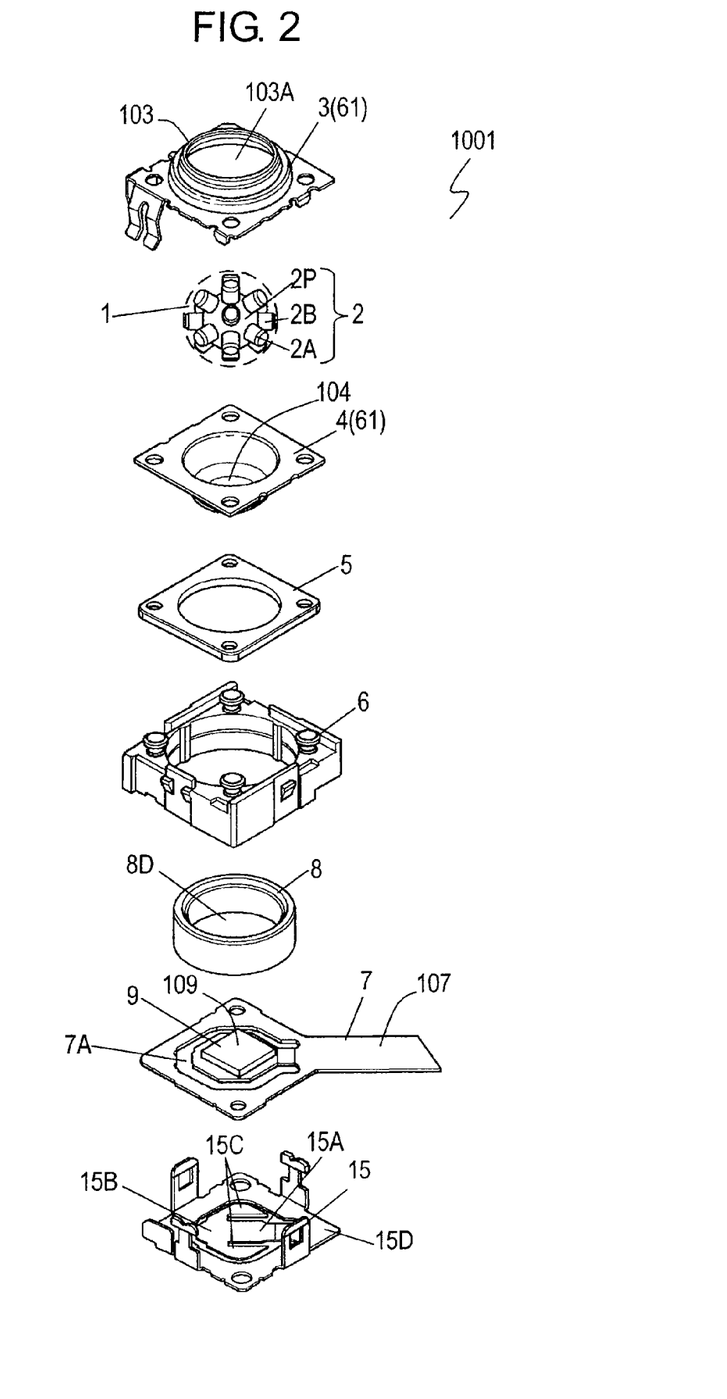
FIG. 2 is an exploded perspective view of the input apparatus according to the embodiment.

FIG. 1 and FIG. 2 are a cross-sectional view and an exploded perspective view of input apparatus 1001 according to an exemplary embodiment of the present invention, respectively. Operation body 1 has a spherical shape and is made of insulating resin, such as ABS, polycarbonate, or urethane. Magnetic body 2 is made of magnetic material, such as permalloy, iron, or Ni—Fe alloy. Magnetic body 2 includes substantially-spherical core 2P; and protrusions 2A and 2B radially protruding from core 2P (e.g., 24 protrusions). Protrusions 2A and 2B have substantially a circular columnar shape. Magnetic body 2 is buried in operation body 1 and is fixed to operation body 1.

Case 61 is made of a thin metal plate, such as a steel plate, and has space 61P therein for storing operation body 1 rotatably. Case 61 is composed of upper case 3 and lower case 4. Upper case 3 and lower case 4 have space 61P that stores operation body 1 rotatably between the upper and lower cases. The upper part of operation body 1 protrudes from opening hole 103A provided in upper surface 103 of upper case 3.

Cover 5 has a substantially plate shape and is made of elastic material, such as elastomer. Retention body 6 is made of insulating resin, such as polybutylene terephthalate or polystyrene. Case 61 (upper case 3 and lower case 4) storing therein operation body 1 is placed on the upper surface of retention body 6 via cover 5.

Film-like wiring board 7 is made of flexible insulating film, such as polyethylene terephthalate or polycarbonate. Wiring patterns made of conductive material such as carbon, silver, or a copper foil are provided on upper surface 107 and lower surface 207 of wiring board 7. Magnet 8 provided on upper surface 107 of wiring board 7 has a substantially cylindrical shape having hollow section 8D and is made of magnet material, such as Nd—Fe—B alloy. Magnet 8 surrounds at least the lower part of operation body 1. Magnet 8 is arranged so that the north pole faces upward and the south pole faces downward for example.

Magnetic detection element 9 is fixed to upper surface 107 of wiring board 7 inside an inner periphery of hollow section 8D of magnet 8. Magnetic detection element 9 has upper surface 109 and lower surface 209 fixed to upper surface 107 of wiring board 7. Magnetic detection element 9 has magnetic sensors 9A and 9B, such as Hall elements, for detecting a magnetic flux in a vertical direction or a GMR element for detecting a magnetic flux in a horizontal direction. The number of magnetic sensors 9A and 9B is for example nine or more. In this embodiment, magnetic sensors 9A and 9B are arranged in a matrix shape having three rows and three columns so as to be parallel to upper surface 109 of magnetic detection element 9. Upper surface 109 of magnetic detection element 9 faces operation body 1 with a predetermined space therebetween. Magnetic detection element 9 is surrounded by wiring board 7 that has substantially U-shaped notch 7A therein.

Frame 15 made of a thin metal plate, such as a steel plate or a copper alloy plate, has an upper part fixed to retention body 6. Thus, upper case 3 and lower case 4, and operation body 1 stored therein, magnet 8, and magnetic detection element 9 for example are retained at predetermined positions. Case 61 (lower case 4) has inner bottom surface 104 that faces space 61P and that is parallel to lower surface 261 at an opposite side of lower surface 261. Operation body 1 having a spherical shape contacts inner bottom surface 104.

Figure 3:
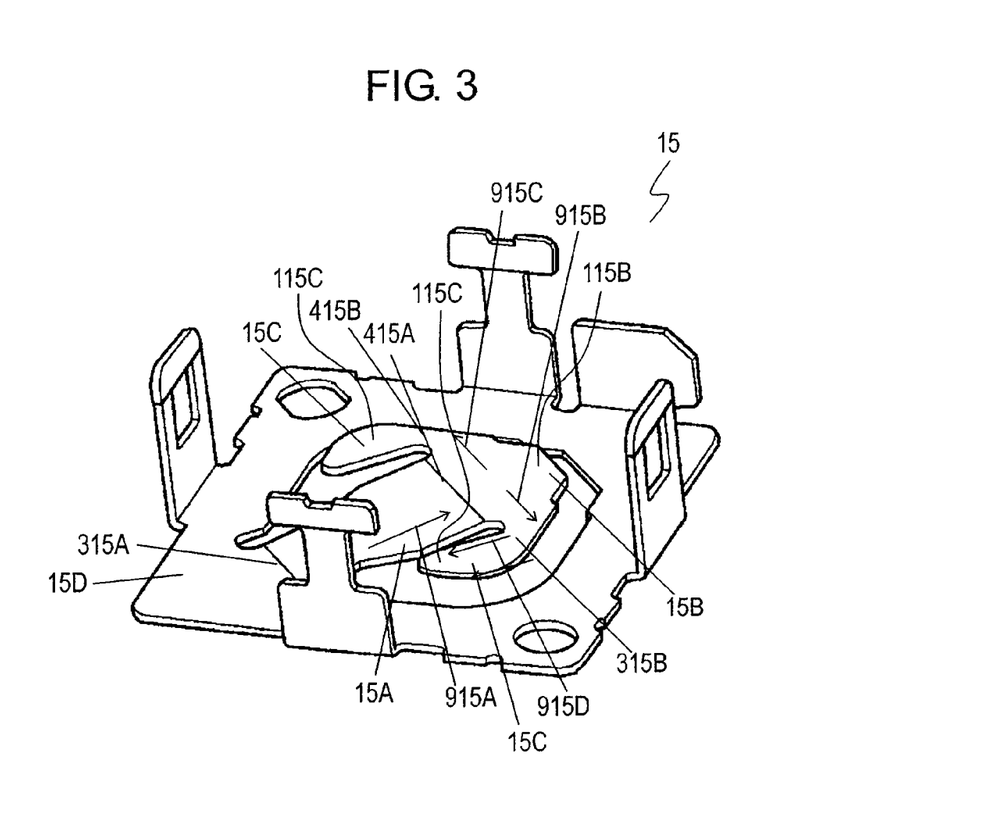
FIG. 3 is a perspective view of a frame of the input apparatus according to the embodiment.

FIG. 3 is a perspective view of frame 15. Frame 15 has bottom plate 15D, bent section 15A bent from bottom plate 15D in an oblique upward direction, depression section 15B connected to bent section 15A, and depression sections 15C extending to the left from both ends of depression section 15B. Bent section 15A has end 315A connected to bottom plate 15D and end 415A at an opposite side of end 315A. End 415A of bent section 15A is connected to depression section 15B. Depression sections 15B and 15C have a flat and substantially tongue shape, and have upper surfaces 115B and 115C, respectively. Bent section 15A extends from bottom plate 15D in direction 915A. Depression section 15B has ends 315B and 415B that extend in directions 915B and 915C that are perpendicular to direction 915A and that are opposite to each other, respectively. Two depression sections 15C respectively extend from ends 315B and 415B of depression section 15B in direction 915D that is parallel to lower surface 209 of magnetic detection element 9 and that is opposite to direction 915A.

While bent section 15A is being slightly deflected, depression sections 15B and 15C urges lower surface 209 of magnetic detection element 9 in the upward direction via wiring board 7. Specifically, depression section 15B depresses the right part of lower surface 209 of magnetic detection element 9 and depression section 15C depresses the left part of lower surface 209 of magnetic detection element 9. Upon Being urged by depression sections 15B and 15C, upper surface 109 of magnetic detection element 9 elastically contacts lower case 4 (i.e., lower surface 261 of case 61) to thereby constitute input apparatus 1001. In this embodiment, bottom plate 15D is parallel to lower surface 261 of case 61 (see FIG. 1).

Specifically, substantially tongue-shaped depression sections 15B and 15C depress a plurality of portions of lower surface 209 of magnetic detection element 9 to elastically contact lower surface 261 of lower case 4 (case 61) while upper surface 109 of magnetic detection element 9 is parallel to lower surface 261 of case 61 without an inclination.

Figure 4:
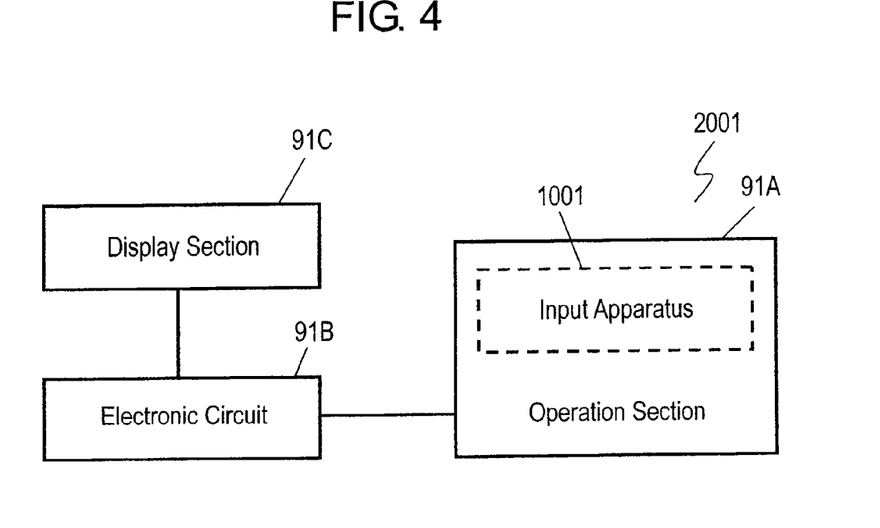
FIG. 4 is a block diagram of an electronic device including the input apparatus according to the embodiment.

FIG. 4 is a block diagram of electronic device 2001 having input apparatus 1001 installed thereto. Electronic device 2001 is a mobile phone or a personal computer for example. Electronic device 2001 includes: operation section 91A operated by an operator, electronic circuit 91B, and display section 91C, such as a liquid crystal display element. Input apparatus 1001 is attached to operation section 91A so that an upper part of operation body 1 is protruded. Magnetic detection element 9 is electrically connected to electronic circuit 91B via the wiring patterns.

While electronic circuit 91B display, on display section 91C, a plurality of menus, such as names or song titles or a cursor, the operator operates the upper part of operation body 1 with a finger by rotating the upper part from front to back and from side to side or in an oblique direction. In accordance with this, magnetic body 2 buried in operation body 1 is also rotated. When operation body 1 is rotated in the right direction for example, protrusion 2A of magnetic body 2 is moved firstly toward magnetic sensor 9A of magnetic detection element 9.

Then, when protrusion 2A is at the closest position to magnetic sensor 9A, the magnetic flux of substantially-cylindrical magnet 8 provided at the lower side of operation body 1 is detected by magnetic sensor 9A via protrusion 2A. Specifically, the magnetic flux of magnet 8 comes out of protrusion 2A and is detected by magnetic sensor 9A.

When operation body 1 is continuously rotated in the right direction, protrusion 2A is moved away from magnetic sensor 9A to move toward magnetic sensor 9B and protrusion 2B is moved toward magnetic sensor 9A. Then, the magnetic flux of magnet 8 is detected by magnetic sensor 9A via protrusion 2B. Specifically, the magnetic flux of magnet 8 comes out of protrusion 2B and is detected by magnetic sensor 9A.

Specifically, magnetic sensor 9A of magnetic detection element 9 once detects the magnetic flux of magnet 8 when protrusion 2A is at the closest position to magnetic sensor 9A. Thereafter, the magnetic flux once weakens. When protrusion 2B is subsequently at the closest position to magnetic sensor 9A, magnetic sensor 9A detects the magnetic flux one more time. Whenever such detection is performed, magnetic sensor 9A outputs a pulsed voltage signal to electronic circuit 91B.

Whenever such detection is performed, magnetic sensor 9B provided adjacent to magnetic sensor 9A also detects the magnetic fluxes from protrusions 2A and 2B. Magnetic sensor 9B is provided at such a position to magnetic sensor 9A that is dislocated by a predetermined interval along upper surface 109. Thus, a voltage signal output from magnetic sensor 9B has a phase difference corresponding to a predetermined time to a voltage signal from magnetic sensor 9A.

Based on the two pulsed voltage signals having a phase difference, electronic circuit 91B detects the rotation direction of operation body 1 based on which of the voltage signals from magnetic sensors 9A and 9B firstly rises. Electronic circuit 91B also detects the rotation angle of operation body 1 based on the number of pulses of the voltage signals. Based on the detected rotation direction and the detected rotation angle, electronic circuit 91B causes the cursor displayed on display section 91C to move in a direction corresponding to the rotation direction (e.g., right direction) by a distance corresponding to the rotation angle.

When operation body 1 is operated by being rotated in the left direction, the front-and-rear direction, or an oblique direction therebetween, magnetic sensors 9A and 9B output a plurality of pulse voltage signals having a phase difference. Based on these signals, electronic circuit 91B detects the rotation direction and the rotation angle of operation body 1 and causes the cursor of display section 91C to move in the left direction, the up-and-down direction, or the oblique direction.

As described above, the operator can operate, while looking at display section 91C, operation body 1 by rotating operation body 1 in a predetermined direction to thereby move the cursor displayed on display section 91C in a predetermined direction. Thus, the operator can easily operate the electronic device by selecting a menu for example.

In input apparatus 1001 in the embodiment, magnetic detection element 9 for detecting the magnetic flux of magnet 8 via protrusions 2A and 2B is depressed by depression sections 15B and 15C at a plurality of portions of lower surface 209. As a result, upper surface 109 elastically contacts lower surface 261 of lower case 4 while being parallel to lower surface 261 of case 61 (lower case 4) without having an inclination thereto. Thus, magnetic sensors 9A and 9B arranged in the matrix shape can detect a magnetic flux that accurately corresponds to the rotation direction and the rotation angle of magnetic body 2 without an error.

Specifically, depression sections 15B and 15C of frame 15 depress substantially the entire area of lower surface 209 of magnetic detection element 9. Then, upper surface 109 elastically contacts lower surface 261 of lower case 4 while being parallel to lower surface 261 of lower case 4 without an inclination. Thus, a predetermined space is retained between operation body 1 and each of magnetic sensors 9A and 9B arranged in the matrix shape. Thus, the magnetic flux detected by magnetic sensors 9A and 9B has no error to the rotation of magnetic body 2. Thus, input apparatus 1001 can accurately detect the rotation angle of operation body 1.

Figure 5A:
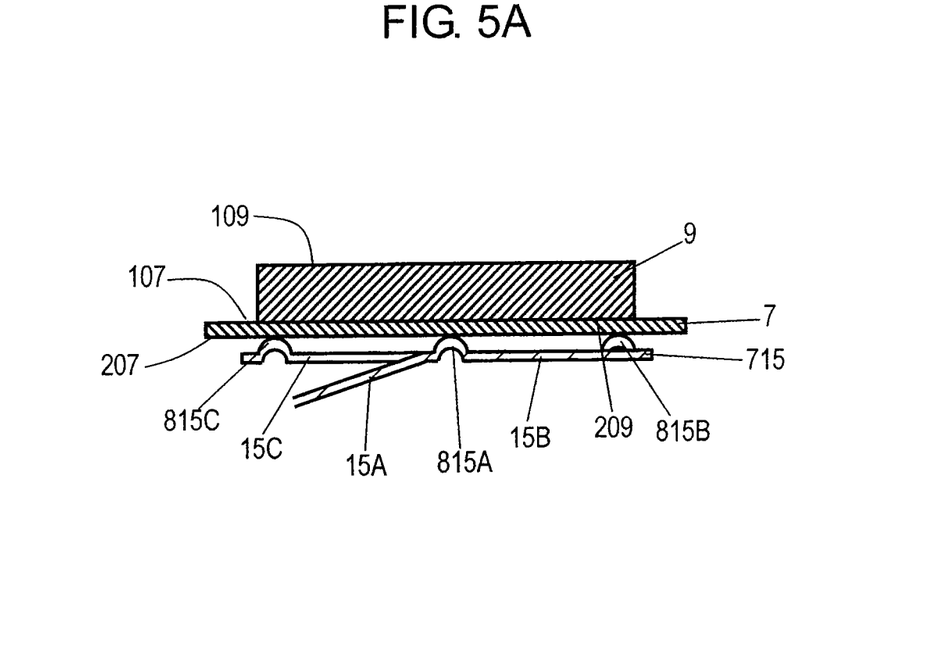
FIG. 5A is a cross-sectional view of another frame of the input apparatus according to the embodiment.

FIG. 5A is a cross-sectional view of input apparatus 1001 in the embodiment and illustrating another frame 715 in particular. In FIG. 5A, the same components as those of frame 15 shown in FIG. 1 to FIG. 3 are denoted with the same reference numerals. Frame 715 shown in FIG. 5A includes projections 815A and 815B provided at depression section 15B, and projection 815C provided at depression section 15C. Projections 815A, 815B, and 815C project to lower surface 209 of magnetic detection element 9 and urge lower surface 209 of magnetic detection element 9 via wiring board 7 toward lower surface 261 of case 61. Projections 815B and 815C depress mutually-opposite ends of lower surface 209 of magnetic detection element 9. Projection 815A depresses a center section of lower surface 209. Projections 815A, 815B, and 815C provide the same effect as that by flat depression sections 15B and 15C.

Figure 5B:
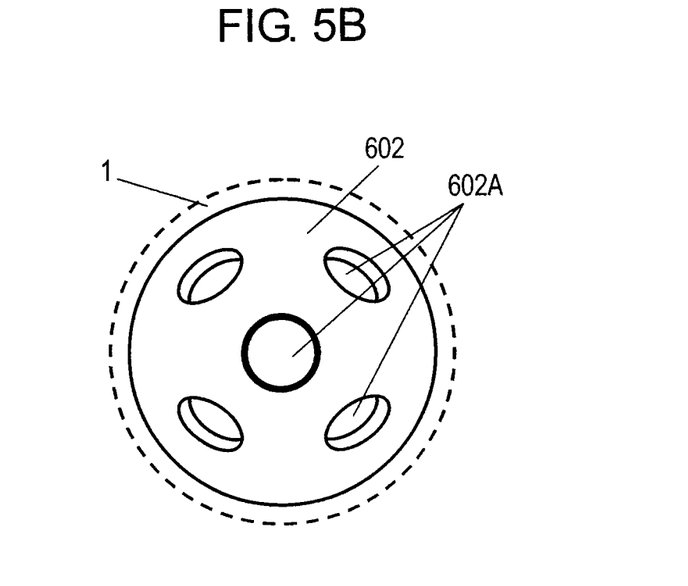
FIG. 5B is a perspective view of another magnetic body of the input apparatus according to the embodiment.

FIG. 5B is a perspective view of another magnetic body 602 of input apparatus 1001 in the embodiment. In FIG. 5B, the same components as those of input apparatus 1001 shown in FIG. 1 and FIG. 2 are denoted with the same reference numerals. Magnetic body 602 shown in FIG. 5B is buried in operation body 1 having a spherical shape. Magnetic body 602 is made of similar material as that of magnetic body 2, has a hollow spherical shape, and has opening holes 602A connected to a hollow section. The magnetic body may have other shapes, providing the same effect.

As described above, according to this embodiment, case 61 composed of upper case 3 and lower case 4 stores therein operation body 1 rotatably. Frame 15 for retaining upper case 3 and lower case 4 includes substantially tongue-shaped depression sections 15B and 15C. Depression sections 15B and 15C cause magnetic detection element 9 to elastically contact lower surface 261 of lower case 4. Depression sections 15B and 15C can depress a plurality of portions of lower surface 209 of magnetic detection element 9 so that magnetic detection element 9 can elastically contact lower surface 261 of lower case 4 while being parallel thereto without having an inclination. Thus, input apparatus 1001 can be obtained for which the detected magnetic flux has no error, the rotation angle of operation body 1 can be detected accurately, and the operation thereof can be achieved securely.

Input apparatus 1001 according to the embodiment causes no error and can be operated securely. Thus, input apparatus 1001 can be used to operate various electronic devices.

As described above, operation body 1 is stored rotatably in case 61. Magnetic body 2 (602) is fixed to operation body 1. Magnet 8 is provided around operation body 1. Magnetic detection element 9 faces operation body 1 with a predetermined space therebetween, and detects a magnetic flux from magnetic body 1. Frame 15 retains case 61. Frame 15 includes depression sections 15B and 15C for causing magnetic detection element 9 to elastically contact lower surface 261 of case 61. Depression sections 15B and 15C may have a substantially tongue shape. Depression sections 15B and 15C of frame 15 cause magnetic detection element 9 to elastically contact lower surface 261 of case 61 so as to allow magnetic detection element 9 be parallel to lower surface 261 of case 61.

Terms, such as "upper surface", "lower surface", "upward", and "downward", indicating directions represent relative directions that depend only on relative positional relation of operation body 1 and magnetic detection element 9, and do not represent absolute directions, such as a vertical direction.

The invention claimed is:

1. An input apparatus comprising:
   a case having a lower surface;
   an operation body stored rotatably in the case;
   a magnetic body fixed to the operation body;
   a magnet provided around the operation body;
   a magnetic detection element for detecting a magnetic flux from the magnetic body, the magnetic detection element facing the operation body with a predetermined space therebetween; and
   a frame for retaining the case, wherein
   the frame includes a plurality of depression sections for causing the magnetic detection element to elastically contact the lower surface of the case,
   wherein the plurality of depression sections of the frame cause the magnetic detection element to elastically contact the lower surface of the case so as to allow the magnetic detection element be parallel to the lower surface of the case.

2. The input apparatus according to claim 1, wherein the plurality of depression sections have a substantially tongue shape.

3. The input apparatus according to claim 1, wherein the frame further includes a plurality of projections provided at the plurality of depression sections, respectively, a plurality of projections contacting the lower surface of the case.

* * * * *